(12) United States Patent
Browning

(10) Patent No.: US 8,639,948 B2
(45) Date of Patent: Jan. 28, 2014

(54) ENCRYPTED DATA MANAGEMENT IN DATABASE MANAGEMENT SYSTEMS

(75) Inventor: James L. Browning, Columbia, SC (US)

(73) Assignee: Teradata US, Inc., Dayton, OH (US)

(*) Notice: Subject to any disclaimer, the term of this patent is extended or adjusted under 35 U.S.C. 154(b) by 1553 days.

(21) Appl. No.: 11/647,067

(22) Filed: Dec. 28, 2006

(65) Prior Publication Data

US 2010/0250958 A1    Sep. 30, 2010

(51) Int. Cl.
*G06F 12/14* (2006.01)

(52) U.S. Cl.
USPC ............ 713/193; 726/27; 707/769; 707/783; 705/51

(58) Field of Classification Search
USPC ........ 713/193; 705/51; 707/769, 783; 726/27
See application file for complete search history.

(56) References Cited

U.S. PATENT DOCUMENTS

| | | | |
|---|---|---|---|
| 4,375,579 A | 3/1983 | Davida et al. | |
| 6,321,201 B1 | 11/2001 | Dahl | |
| 7,093,137 B1 | 8/2006 | Sato et al. | |
| 8,281,152 B2* | 10/2012 | LeCrone et al. | 713/189 |
| 2002/0129260 A1 | 9/2002 | Benfield et al. | |
| 2003/0123671 A1 | 7/2003 | He et al. | |
| 2003/0215090 A1* | 11/2003 | Saito et al. | 380/201 |
| 2004/0255133 A1 | 12/2004 | Lei et al. | |
| 2006/0053112 A1 | 3/2006 | Chitkara et al. | |
| 2006/0218190 A1 | 9/2006 | Frost et al. | |
| 2006/0218412 A1* | 9/2006 | Hars et al. | 713/193 |
| 2006/0236104 A1 | 10/2006 | Wong et al. | |
| 2007/0233935 A1* | 10/2007 | Amiri et al. | 711/100 |

* cited by examiner

*Primary Examiner* — Eleni Shiferaw
*Assistant Examiner* — Paul Callahan
(74) *Attorney, Agent, or Firm* — Schwegman, Lundberg & Woessner, P.A.

(57) ABSTRACT

The subject matter herein relates to database management systems and, more particularly, encrypted data management in database management systems. Various embodiments provide systems, methods, and software to maintain database tables, some of which are encrypted. Some embodiments include holding clear text in cache and servicing queries from the cache. When a query is received, a file system of the database management system determines if a table holding data to service the query is encrypted. If the table is encrypted, the file system decrypts the data and writes the data to the cache as clear text. Some embodiments, when writing clear text to a table from the cache, determine if the table to which the data is to be written is an encrypted table. If the table is encrypted, the file system encrypts the clear text and stores the cipher text to the encrypted table.

25 Claims, 4 Drawing Sheets

FIG. 2

| CYLINDER INDEX | ENCRYPTED DATA BLOCK | ENCRYPTED DATA BLOCK | | ENCRYPTED DATA BLOCK | |
|---|---|---|---|---|---|
| CYLINDER INDEX | | DATA BLOCK | | DATA BLOCK | DATA BLOCK |
| CYLINDER INDEX | DATA BLOCK | DATA BLOCK | ENCRYPTED DATA BLOCK | | |
| CYLINDER INDEX | ENCRYPTED DATA BLOCK | ENCRYPTED DATA BLOCK | | DATA BLOCK | |

■
■
■

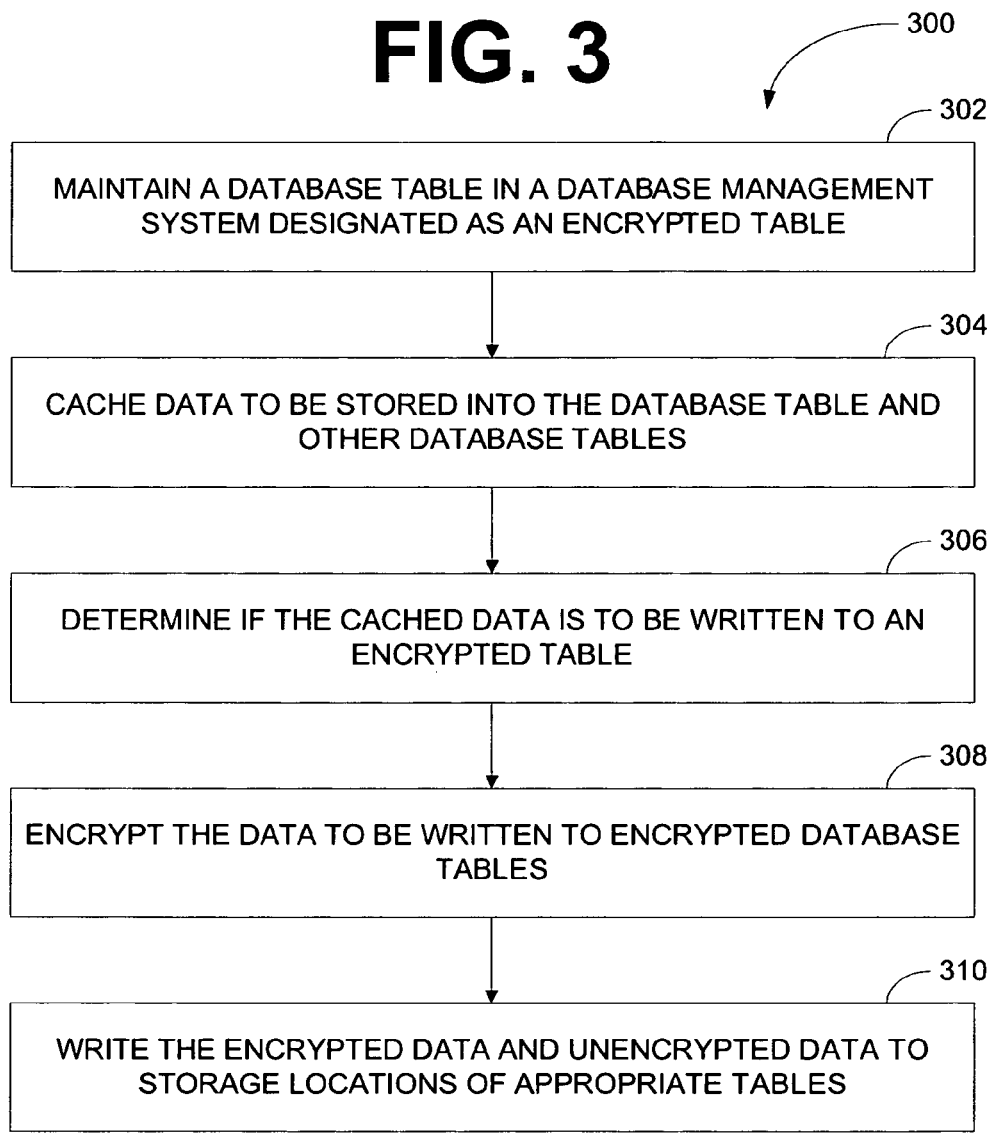

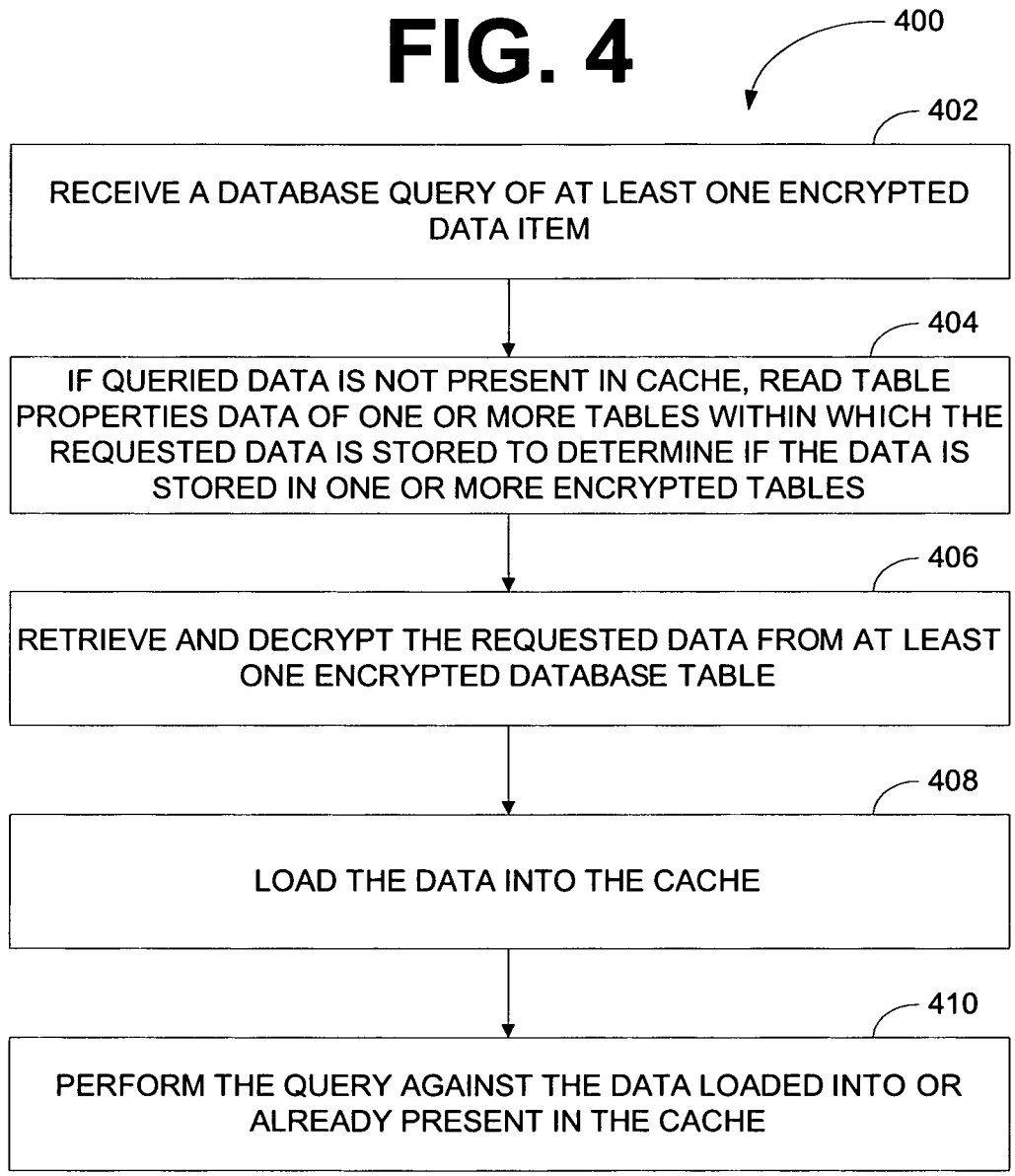

ENCRYPTED DATA MANAGEMENT IN DATABASE MANAGEMENT SYSTEMS

TECHNICAL FIELD

The inventive subject matter relates to database management systems and, more particularly, encrypted data management in database management systems.

BACKGROUND INFORMATION

To prevent the compromise of sensitive information (credit card numbers, social security numbers, etc.), industry standards and security/privacy laws often mandate the use of encryption. Such standards and laws include the Health Insurance Portability and Accountability Act of 1996 (HIPAA), the Database Breach Notification Act (CA SB 1386), the Payment Card Industry Data Security Standard, and others.

Encryption is the process of translating data (clear text) into a form that is not interpretable (cipher text) should the data be compromised. This translation is done using strong cryptographic algorithms in conjunction with secret keys. The correct secret key is required to reverse the translation such that the original data can be interpreted. To ensure the security of the process, the strong cryptographic algorithms employ advanced mathematical techniques that tend to be very processing intensive. As such, there is some performance overhead incurred to encrypt and decrypt sensitive information.

The traditional approach used to manage encrypted data within a database management system is to encrypt data at the column-level within a table. This allows for encryption to be used only for data that is considered sensitive.

However, typical data warehouse applications involve running queries against very large data sets. Consequently, such queries can require many millions or billions of decryption operations if a portion of the large data set is encrypted. The performance overhead resulting from the decryption operations can potentially render the queries unusable.

BRIEF DESCRIPTION OF THE DRAWINGS

FIG. 2 is a logical diagram of data blocks stored within a group of cylinders according to an example embodiment.

FIG. 3 is a flow diagram of a method according to an example embodiment.

FIG. 4 is a flow diagram of a method according to an example embodiment.

DETAILED DESCRIPTION

Figure 1:
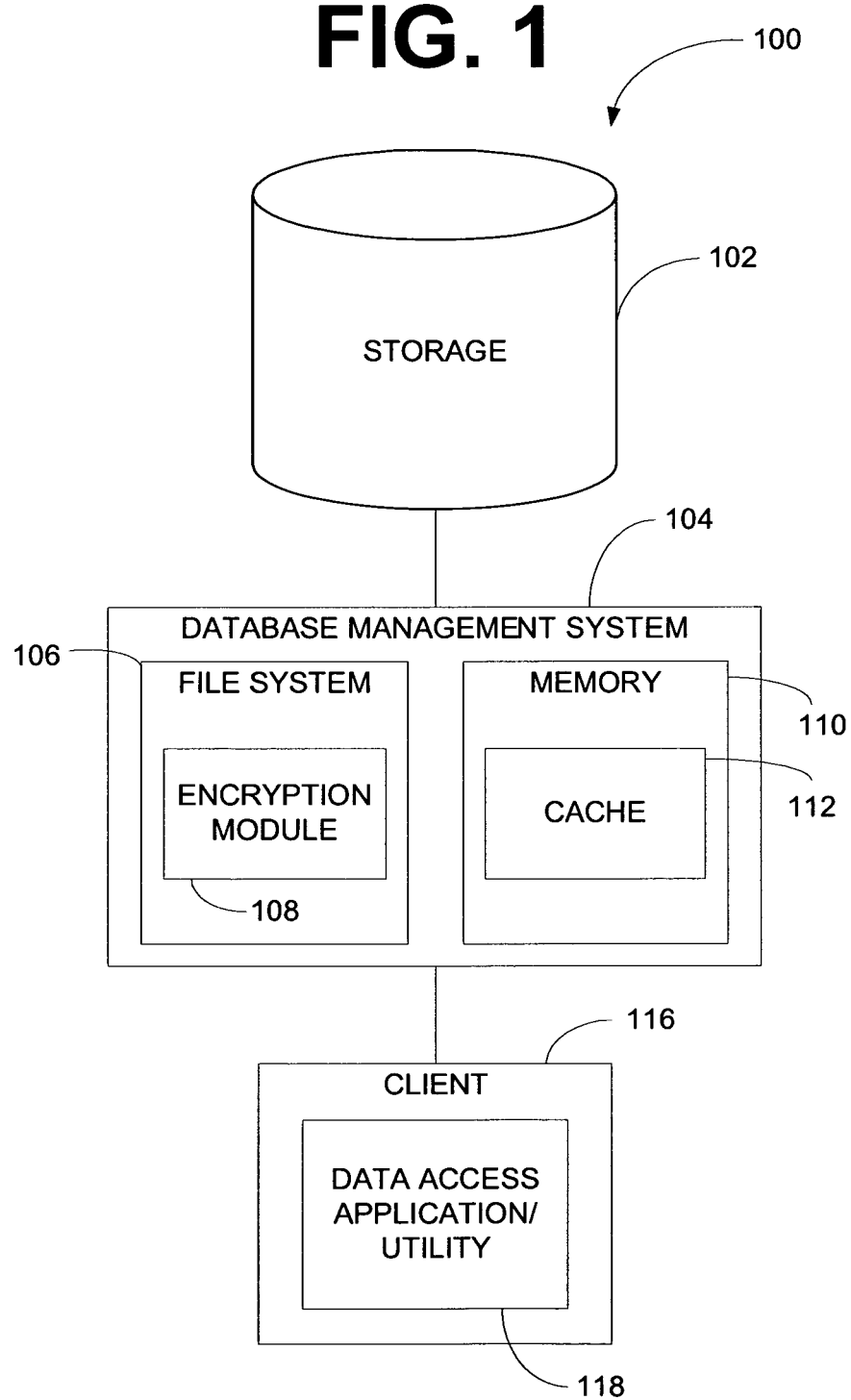
FIG. 1 is a block diagram of a system according to an example embodiment.

The various system, method, and software embodiments described herein provide new methods to manage encrypted data in databases. In many databases, these embodiments enhance performance when storing, retrieving, and querying encrypted data, especially when performing queries against large datasets. Some such embodiments provide for encryption of database tables at the block-level rather than at the column-level. Encryption and decryption operations are performed when data blocks associated with an encrypted table are written to and retrieved from storage, such as hard disk. These and other embodiments are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 according to an example embodiment. The system 100 includes a storage device 102, a database management system 104, and a client 116.

The storage device 102, in some embodiments, is a hard disk resident on a computing device and can be accessed by the database management system 104. In some embodiments, the database management system 104 and the storage device are located on the same computing device, such as a server computer. In other embodiments, the storage device 102 includes one or more computing devices such as a storage server, a storage area network, or another suitable device.

The client 116, in some embodiments, is a client computer and includes a data access application or utility 118. The client 116 is communicatively coupled to the database management system 104 and may submit queries to and receive query results from the database management system 104.

The database management system 104, in typical embodiments, is a relational database management system. The database management system includes a file system 106 and a memory 110.

The memory 110 is a memory that is resident on a computing device on which the database management system 104 operates. The memory 110 is illustrated within the database management system 104 merely as a logical representation.

The memory 110 includes a cache 112 that holds transient data under control of the file system 106. Data written to the database management system 104 is first written to the cache 112 and eventually is flushed from the cache 112 after the file system 106 writes the data to the storage device 102. Also, data retrieved from the storage device 102 in response to a query, or other operation, is retrieved by the file system 106 to the cache 112.

The database management system 104 includes a file system. In some embodiments, the system 106 provides service calls that allow the database management system 104 to store and retrieve data independent of an underlying operating system. The file system 106 typically manages data blocks that contain one or more rows of a single table. In some embodiments, physical input and output performed by the file system 106 is performed at the granularity of one or more data blocks. Data blocks are physically stored on disk in sectors which are logically grouped together as cylinders. The first portion of a cylinder contains the cylinder index which describes the location and length of each data block on the cylinder. Information about the table with which a data block is associated is also included in the cylinder index. In some such embodiment, the file system 106 maintains the cache 112 in the memory 110. The cache 112 holds data blocks that have been loaded from disk or written by users. All data in the cache is unencrypted clear text. Requests, or queries, for rows within a table are satisfied from data blocks maintained within the cache 112. Thus, when a query is made against the database, the file system 106 identifies the relevant tables, reads those tables into the cache 112, and performs the query against the table or tables in the cache 112.

In some embodiments, one or more tables stored in the storage device 102 may be encrypted. In such embodiments, the cylinder index of a cylinder within which some or all of the data blocks of a table are stored also includes information identifying the table as encrypted. In typical embodiments, the cylinder index also includes a reference to an encryption key to use in encrypting and decrypting data stored in the table. In some other embodiments, a global encryption key may be declared for the database management system 104.

The encryption key, in some embodiments, is a 128-bit Advanced Encryption Standard key. In other typical embodiments, the key is another type of encryption key suitable for symmetric encryption. Larger bit and smaller bit encryption keys may also be used depending on the security requirements of the particular embodiment.

Some embodiments that allow for encrypted tables include an encryption module 108 as part of the file system 106. The encryption module 108 typically is operative to perform encryption and decryption functions on blocks of data before being written to the storage device 102 or to the cache 112. In some embodiments, the encryption module 108 is operative to encrypt and decrypt data according Advanced Encryption Standard, such as by using a 128-bit Advanced Encryption Standard key. In other embodiments, the encryption module is operative to encrypt and decrypt data according to other encryption algorithms, standards, and key types, depending on the specific embodiment.

Thus, when a query is received into the database management system 104, the database file system 106 determines if the requested data is resident in the cache 112. If so, the file system 106 performs the query against the data already in the cache 112. If the data is not resident in the cache 112, the file system 106 identifies the relevant table, or tables, from the query, determines if any of the tables are encrypted, retrieves the identified keys, and decrypts the data of the encrypted table, or tables, and writes all of the requested data of the query into the cache 112. The file system 106 then performs the query against the data, in clear text form, in the cache 112. Performing the decrypt function against a block of data, the number of decryption functions performed by the database management system is reduced as compared against previous row by row decryption methods. In many embodiments, this reduces the amount of database management system 104 overhead associated with decrypting data. The same holds true when encrypting data at the block level.

An example syntax to create an encrypted table, in an example embodiment is:

CREATE TABLE table_name . . . ENCRYPT key_identifier . . . ;

This syntax would create a table with the name "table_name" and the "key_identifier" provides a reference to an encryption key to use in encrypting and decrypting the table data. Further, to modify a previously existing table, the syntax would be:

MODIFY TABLE table_name . . . ENCRYPT key_identifier . . . ;

In an example embodiment, when the file system 106 performs a write to the storage device 102 with data from the cache 112, the algorithm the file system 106 would use is:

```
. . .
IF table_name in cylinder index is ENCRYPT, THEN
    Encrypt data bock using specified key_identifier
ENDIF
. . .
Write data block to storage device
. . .
```

This results in encrypted data blocks stored in each cylinder that contains one or more data blocks for the encrypted table. A cylinder may also contain unencrypted data blocks if rows from two tables are stored as part of the cylinder and the second table is not encrypted. FIG. 2 provides a logical depiction of the resulting relationship between the cylinder index and encrypted and unencrypted blocks within a group of cylinders.

FIG. 2 is a logical diagram of data blocks stored within a group of cylinders according to an example embodiment. The group of cylinders provides an example view of how data may be stored within the storage device 102 of FIG. 1. Note that a cylinder may include one or both of encrypted data blocks (represented in FIG. 2 as "UNENCRYPTED DATA BLOCK") and unencrypted data blocks (represented in FIG. 2 as "DATA BLOCK").

When the file system 106 retrieves a data block from the storage device 102 to store in the cache 112, the file system 106, in an example embodiment performs the following algorithm:

```
. . .
Read data block from disk
. . .
IF table_name in cylinder index is specified with ENCRYPT
attribute, THEN
    Decrypt data block using the specified key_identifier
ENDIF
. . .
Store data block in cache
. . .
```

This algorithm reads a data block from disk and determines if the data block is encrypted as specified by the table attributes stored in the cylinder index. If the table is not encrypted, the file system 106 writes the data directly to the cache 112. If the table is encrypted, the file system 106 uses the encryption module 108 is used to decrypt the block using the key_identifier and writes the data block to the cache 112.

This results in clear text data blocks being written to the cache 112 for all retrieved tables. As such, any queries satisfied from cached data blocks would not experience any performance degradation. Only queries against encrypted tables where data blocks must be read from disk and decrypted would experience any performance degradation as a result of decryption operations. However, due to the decryption being performed at the block level, the amount of performance degradation is minimized.

FIG. 3 is a flow diagram of a method 300 according to an example embodiment. The example method 300 includes maintaining a database table in a database management system designated as an encrypted table 302 and caching data to be stored into the database table and other database tables 304. The example method 300 further includes determining if the cached data is to be written to an encrypted table 306, encrypting the data to be written to encrypted database tables 308, and writing the encrypted data to storage locations of appropriate tables 310.

FIG. 4 is a flow diagram of a method 400 according to an example embodiment. The example method 400 typically includes receiving a database query of at least one encrypted data item 402. If the queried data is not present in the cache, the method 400 includes reading table properties data of one or more tables within which the requested data is stored to determine if the data is stored in one or more encrypted tables 404. The method 400 then retrieves and decrypts the requested data from at least one encrypted database table 406 and loads the data into the cache 408. The method 400 then performs the query against the data loaded into the cache 410. Performing the query against the data loaded into the cache may also include performing the query against data already in the cache. Thus, if all or part of the data necessary to perform the received database query 402 is already present in the cache, the data need not be retrieved again just to perform the query.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method implemented and residing in a non-transitory computer-readable storage medium for execution on a processor, comprising:

maintaining, by the processor, a database table in a database management system designated as an encrypted table;

caching, by the processor, data to be stored into the database table and other database tables;

determining, by the processor, if the cached data is to be written to an encrypted table based on table attributes for the database table stored in a cylinder index for cylinders;

encrypting, by the processor, the data to be written to encrypted database tables, encryption performed on specific blocks for the database table, the specific blocks are physically stored on a disk in sectors grouped together as the cylinders and each block includes one or more rows of the database table, encryption is done for the database table on a block level rather than a column level; and writing, by the processor, the encrypted data to storage locations of appropriate tables, the encrypted data stored and retrieved independent of an underlying operating system.

2. The method of claim 1, wherein the database table is stored in one or more data blocks of the cylinders.

3. The method of claim 2, wherein an index of a particular cylinder includes the encrypted table designation of the database table.

4. The method of claim 3, wherein the particular cylinder index further includes an encryption key identifier.

5. A method implemented and residing in a non-transitory computer-readable storage medium for execution on a processor, comprising:

receiving, by the processor, a database query of at least one encrypted data item;

reading, by the processor, table properties data of one or more tables within which the requested data is stored to determine if the data is stored in one or more encrypted tables, at least some of the table properties data identified as table attributes for the one or more tables stored in a cylinder index for cylinders, each table stored in one or more blocks of the cylinder, and each block representing one or more rows of a particular table;

retrieving and decrypting, by the processor, the requested data from at least one encrypted database table at a specific block level rather than a column level, the requested data stored and retrieved independent of an underlying operating system;

loading, by the processor, the data into the cache; and performing, by the processor, the query against the data loaded into the cache, all data in cache is clear text and not encrypted.

6. The method of claim 5, further comprising:

determining, by the processor, if the queried data is present in a cache before the reading of the table properties data, the retrieving and decrypting, and the loading of the cache; and performing, by the processor, the query against the data already loaded into the cache.

7. The method of claim 5, wherein:

tables are stored in one or more data blocks of the cylinders; and the table properties data is also stored in the cylinder index each cylinder and identifies encrypted data blocks holding all or a portion of an encrypted database table.

8. The method of claim 7, wherein a cylinder stores encrypted and unencrypted data blocks.

9. The method of claim 7, wherein the cylinder index identifying a data block as encrypted further includes a reference to an encryption key identifier.

10. The method of claim 9, wherein the encryption key identifier references a 128-bit advanced encryption standard encryption key.

11. A system comprising: one or more processors implemented at least partially in hardware and configured with a database management system including:
a cache; and
a file system operative to:
read data in the cache and identify a table to which the data is to be stored;
determine if a table to which data is to be stored is an encrypted table and an encryption key of each encrypted table, the determination of the encrypted table and the encryption key identified as table attributes for the table in a cylinder index for cylinders, the table represented in one or more blocks of the cylinders, and each block representing one or more rows of the table;
encrypt the data to be stored to an encrypted table according to the encryption key referenced by an encryption key identifier of each respective encrypted table, encryption performed at a specific block level for the table rather than a column level, the specific block is physically stored on a disk in sectors grouped together as the cylinders; and
store the encrypted data in the table, the encrypted data stored and retrieved independent of an underlying operating system.

12. The system of claim 11, wherein the file system is further operative to:
receive a database query;
if the data is not held in the cache, identifying one or more tables in the storage device holding the requested data;
reading index data of storage locations where the one or more tables are stored in a storage device to determine which of the one or more tables are encrypted and an encryption key referenced by an encryption key identifier to use in decrypting each encrypted table;
reading the tables out into the cache, wherein the data stored in encrypted tables is decrypted before it is read out into the cache; and
service the query from the data in the cache.

13. The system of claim 11, wherein the encryption key referenced by an encryption key identifier of at least one encrypted table is a 128-bit advanced encryption standard encryption key.

14. The system of claim 11, wherein:
the file system manages data stored in the database by storing a table in one or more blocks of one or more cylinders; and
a cylinder holds encrypted data blocks and unencrypted data blocks.

15. The system of claim 12, wherein all data in the cache is clear text.

16. A non-transitory computer-readable medium, with instructions, which when processed by a machine, cause the machine to:
maintain, by the machine, a database table in a database management system designated as an encrypted table;
cache, by the machine, data to be stored into the database table and other database tables;
determine, by the machine, if the cached data is to be written to an encrypted table based on table attributes for the database table stored in a cylinder index for cylinders, the database table stored in one or more blocks of the cylinders and each block having one or more rows of the database table;
encrypt, by the machine, the data to be written to encrypted database tables, encryption performed at a specific block for the database table rather than a column level, the specific block is physically stored on a disk in sectors grouped together as the cylinders; and
write, by the machine, the encrypted data and unencrypted data to storage locations of appropriate tables, the encrypted data stored and retrieved independent of an underlying operating system.

17. The machine-readable medium of claim 16, wherein the database table is stored in one or more data blocks of the cylinders.

18. The machine-readable medium of claim 17, wherein an index of a particular cylinder includes the encrypted table designation of the database table.

19. The machine-readable medium of claim 18, wherein the cylinder index further includes an encryption key identifier.

20. The machine-readable medium of claim 16, with further instructions, which when processed, further causes the machine to:
receive a database query of at least one encrypted data item;
read table properties data of one or more tables within which the requested data is stored to determine if the data is stored in one or more encrypted tables;
retrieve and decrypt the requested data from at least one encrypted database table;
load the data into the cache; and
perform the query against the data loaded into the cache.

21. The machine-readable medium of claim 20, with further instructions, which when processed, further causes the machine to:
determine if the queried data is present in a cache before the reading of the table properties data, the retrieving and decrypting, and the loading of the cache; and
perform the query against the data already loaded into the cache.

22. The machine-readable medium of claim 20, wherein:
tables are stored in one or more data blocks of one or more cylinders; and
the table properties data is stored in a cylinder index each cylinder and identifies encrypted data blocks holding all or a portion of an encrypted database table.

23. The machine-readable medium of claim 22, wherein a cylinder stores encrypted and unencrypted data blocks.

24. The machine-readable medium of claim 22, wherein a cylinder index identifying a data block as encrypted further includes a reference to an encryption key identifier.

25. The machine-readable medium of claim 24, wherein the encryption key referenced by an encryption key identifier is a 128-bit advanced encryption standard encryption key.

* * * * *